F. B. LADD.
STABILIZER FOR FISH HOOKS AND LINKS.
APPLICATION FILED OCT. 8, 1913.
1,250,473.
Patented Dec. 18, 1917.
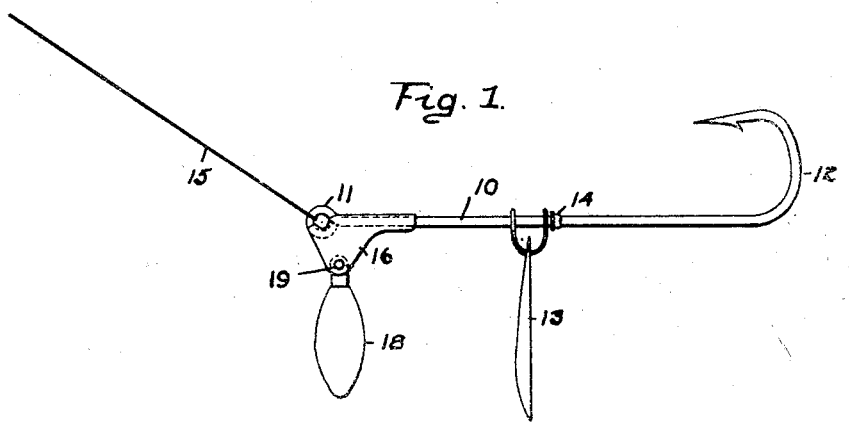
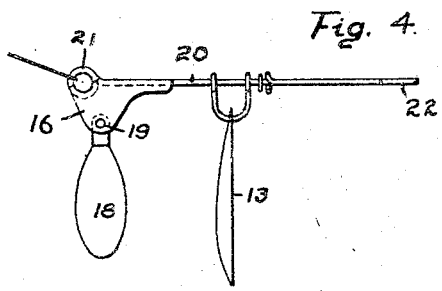
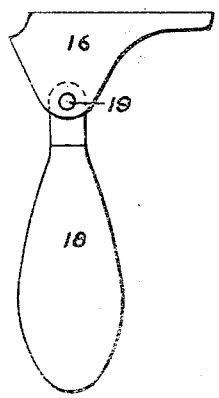
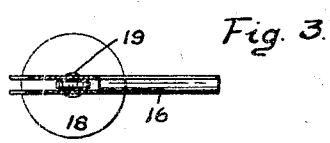
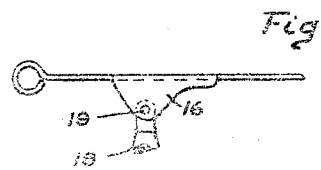
WITNESSES:
Helen F. Glenn
Isaac N. Taylor
INVENTOR.
Franklin B. Ladd
BY Taylor & Hulse
ATTORNEYS.

UNITED STATES PATENT OFFICE.

FRANKLIN B. LADD, OF FORT WAYNE, INDIANA.

STABILIZER FOR FISH HOOKS AND LINKS.

1,250,473.　　　　Specification of Letters Patent.　　Patented Dec. 18, 1917.

Application filed October 8, 1913. Serial No. 794,013.

*To all whom it may concern:*

Be it known that I, FRANKLIN B. LADD, a citizen of the United States, residing at Fort Wayne, in the county of Allen and State of Indiana, have invented new and useful Improvements in Stabilizers for Fish Hooks and Links, of which the following is a specification.

My invention relates to attachments for fish hooks and links. The experience of fishermen has heretofore been that most hooks will rotate while passing through the water, either while trolling or reeling in after a cast, thereby twisting and kinking the line, and causing the line to break at the kink when the line is strained by a caught fish. The object of my invention is to provide a fish hook or link with means which will prevent the same from rotating while passing through the water and insure its upright position at all times; and my invention consists in the novel combination of parts hereinafter set forth and illustrated in the drawings.

In the drawings I have illustrated the preferred mode of carrying out my invention, in which Figure 1 is a side view of a fish hook provided with my invention; Fig. 2, a side elevation of the stabilizer; Fig. 3, a plan view of the stabilizer; Fig. 4, a side view of a link provided with my invention and Fig. 5, a side view of a hook or link having my invention attached at a different point thereon than that of the previous views.

Referring to the drawings, the hook is of the usual formation, having a shank 10, an eye 11 at one end and a barb 12 at the opposite end. A spinner 13 may be provided if desired, which bears against a shoulder 14 on the shank. 15 indicates a line or leader connected to the eye of the hook. The stabilizer is attached at a suitable point to the shank 10, by soldering to or pinching the same on said shank. In Fig. 1 the stabilizer is attached at the eye extremity of the shank. It consists of a bracket, preferably of U form, opening downwardly, the closed top resting on the top of the shank and soldered or otherwise secured thereto, as shown in Fig. 1, or it may be secured to the lower surface of the shank as shown in Figs. 4 and 5. The bracket, when secured, as shown in Figs. 1 and 4, is cut or rounded out at its upper forward corner in order that the same may be secured to the lower portion of the eye. When the bracket is to be secured to a shank at a point rearwardly of the eye as shown in Fig. 5, there is, of course, no necessity for cutting out the upper corner.

In the lower portion of the bracket and rearwardly of its forward or "eye" end is pivotally hung a weight 18, the pivot 19 being borne in suitable bearings formed in the bracket. The weight has freedom of motion in an arc in the direction of the length of the shank. Its forward movement is limited by the edge of the bracket below the eye on the shank and its rear movement is limited by the shank. In other words, the weight can swing in an arc until it meets the shank in one direction, and the eye in the other direction.

It will be noted that the weight is substantially oval in shape and that it has no corner or part which will catch in a weed as the device is traveling through the water. The swinging capability of the weight enables it to swing back should it strike a weed and thus slip around or over the same. During all the movement of the device in the water the weight is below the shank and holds the barb of the hook in the upright position. The independent movement of the weight also prevents the device from traveling through the water in an arc as it is reeled in, as I have found that if the weight is fixed to the shank the device will tend to travel in an arc toward the user instead of in a straight line.

The weight also serves as a casting weight, and as a sinker for the entire device.

I may also secure the stabilizer to a link of any of the well known forms, as 20, Fig. 4, the line being connected to the eye 21 of the shank of the link, and any form of bait is connected to the rear or hooked end 22 of the shank. The weight 18 hangs adjacent the eye end of the shank, as above described, or it may be hung at any other suitable point rearwardly of the eye as illustrated in Fig. 5.

The operation of the stabilizer when used on the link is the same as on the hook, the bait or devices connected to the link being maintained by the weight in the upright position.

The position of the stabilizer relatively to the length of the shank of the hook or link may be altered to suit conditions and any suitable form of bracket may be used, but I prefer to place the stabilizer close to the eye end of the shank and to construct the bracket in a U form. The bracket could be made in two sheets which could be secured to the shank, but I have found the U form the better one for my purpose.

Numerous modifications in the form of the stabilizer and of its mode of attachment to a hook or link, or other similar fishing apparatus, will be readily suggested to one skilled in the art, but I believe all such to be within the spirit of my invention.

What I claim is:

1. In a device of the class described, a shank having an eye at its forward end, a depending U-shaped bracket secured to the lower portion of the eye and a portion of the shank adjacent the eye, and a weight pivotally mounted within the bracket and movable in the direction of the length of the shank only, the pivotal point of the weight being below and slightly rearward of the eye.

2. In a device of the class described, a shank having an eye at one end, a depending bracket secured to the lower portion of the eye and to the adjacent portion of the shank and depending therefrom, a depending weight pivotally secured to the bracket and movable exclusively in the direction of the length of the shank, the pivotal point of the weight being below and slightly rearward of the eye.

In witness whereof I hereunto subscribe my name this — day of October, 1913.

FRANKLIN B. LADD.

Witnesses:
   EDWIN M. HULSE,
   HELEN F. GLENN.